United States Patent [19]

Johnson

[11] Patent Number: 5,080,426

[45] Date of Patent: Jan. 14, 1992

[54] COLLAPSIBLE CAMPER TENT TRAILER

[76] Inventor: Frank L. Johnson, 20839 FM 15, Troup, Tex. 75789

[21] Appl. No.: 503,431

[22] Filed: Mar. 30, 1990

[51] Int. Cl.$^5$ ............................................. B60P 3/32
[52] U.S. Cl. ............................................. 296/161; 296/168
[58] Field of Search .............. 296/156, 159, 161, 162, 296/168, 169, 172, 173, 174, 176

[56] References Cited

U.S. PATENT DOCUMENTS

| | | | |
|---|---|---|---|
| 1,826,136 | 10/1931 | Jordan | 296/161 |
| 2,383,192 | 8/1945 | Heil | 296/161 |
| 2,459,026 | 1/1949 | Hardy | 296/161 |
| 2,513,411 | 7/1950 | Heil | 296/161 |
| 3,703,311 | 11/1972 | Davis et al. | 296/161 |
| 4,088,363 | 5/1978 | Palmer | 296/161 |
| 4,462,631 | 7/1984 | Lange | 296/161 X |

FOREIGN PATENT DOCUMENTS

| | | | |
|---|---|---|---|
| 1211080 | 2/1966 | Fed. Rep. of Germany | 296/161 |
| 1780662 | 10/1973 | Fed. Rep. of Germany | 296/161 |
| 2532597 | 3/1984 | France | 296/161 |

Primary Examiner—Margaret A. Focarino
Assistant Examiner—Joseph D. Pape
Attorney, Agent, or Firm—Ronald B. Sefrna

[57] ABSTRACT

The present invention provides a compact tent trailer of suitably small dimension and low weight to be effectively towed by a motorcycle or small automobile, with a fold-out tent to form an enclosure of sufficient size to comfortably accommodate at least two adults. The trailer portion of the invention includes a storage compartment adapted to be accessible from within the erected tent enclosure as well as from the exterior of the tent trailer with the tent enclosure collapased thereon. The tent enclosure portion of the invention includes a dressing area with a floor frame flexibly connected to the trailer portion to allow erection of the tent enclosure upon uneven ground surfaces, and further provides for easy access to a storage compartment disposed on the trailer portion exterior to the tent enclosure.

14 Claims, 3 Drawing Sheets

COLLAPSIBLE CAMPER TENT TRAILER

FIELD OF THE INVENTION

The present invention generally relates to trailer mounted camping tents, and in one of its embodiments more specifically relates to an integral camper tent and trailer combination in which the tent is adapted to collapse for storage and transportation within the trailer, and the tent and trailer are further adapted to provide a storage area within the trailer which is accessible both with the tent stored in the trailer and from the inside of the tent with the tent expanded for use.

BACKGROUND OF THE INVENTION

With the increase in popularity of travel and outdoor camping activities, there has been a corresponding increase in the use of trailer mounted camping tents as a convenient method of transporting and setting up a tent. Some tent trailers are of a "pop-up" design, in which the trailer bed area is relatively large and the tent is expanded primarily vertically from the trailer bed during set-up. The pop-up designs offer certain advantages, but are often difficult to transport with a small vehicle. Other tent trailer designs utilize a trailer bed of small area with a "fold-out" or collapsible tent which sets up to encompass a larger area within the tent. Such general design has been known in the art for some time, as illustrated by U.S. Pat. No. 1,216,986 to Habig, U.S. Pat. No. 1,564,257 to Lippman, and U.S. Pat. No. 2,216,553 to Greene, et.al. While such arrangements do provide for more spacious tent enclosures, the prior art exemplified by the noted examples makes no specific provision for any sort of recessed storage accessible from within the erected tent enclosure.

Other of the collapsible tent trailer designs provide a storage space in the trailer portion, below the tent with the tent collapsed for transportation. In some designs of the prior art, the storage areas are not accessible from within the erected tent enclosure, and accessibility with the tent collapsed may be difficult and cumbersome. In other designs known in the prior art, illustrated by U.S. Pat. No. 2,459,026 to Hardy and U.S. Pat. No. 4,088,363 to Palmer, a storage space accessible from within the erected tent enclosure is provided, but such storage space is not accessible with the tent in a collapsed position. Another variant, illustrated by U.S. Pat. No. 2,513,411 to Heil, provides a shallow storage space accessible from one side from both within the erected tent and from the exterior of the tent with the tent collapsed upon the trailer. However, the limitation of side access to a shallow, deep storage area is often very inconvenient, making it difficult to see and reach objects stored at the opposite side of the compartment.

Many of the prior art designs for fold-out tent enclosures provide an elevated sleeping area and a small area with its floor at or near ground level. The U.S. patents to Hardy, Palmer, and Heil are examples of this approach, which has the advantage of allowing users of the tent to stand upright within a portion of the tent enclosure. However, the designs of the prior art uniformly utilize a floor frame which is pivotally interconnected to the body of the associated trailer or vehicle, and which is often difficult to set up on uneven ground surfaces. Since one of the major purposes of tent trailers is use in rugged areas, that difficulty or disadvantage is significant.

Thus there remains a need for tent trailer which provides a relatively spacious tent enclosure, provides a storage area readily accessible both from within and from without the tent enclosure, and which is easily erected on uneven ground surfaces.

SUMMARY OF THE INVENTION

The present invention provides a small, lightweight collapsible tent trailer suitable for towing with a small automobile or a motorcycle, incorporating a storage compartment within the trailer. In the tent trailer of the invention, the storage compartment is readily accessible from the interior of the tent with the tent set up for use, and is also readily accessible with the tent collapsed and in place in the upper portion of the trailer structure above the storage compartment. The tent trailer includes a fold out sleeping platform incorporating a hinge design which disposes the fold out portion of the platform in the same plane as the remaining portion of the platform when the tent is set up for use. The tent of the invention expands from a collapsed position upon the trailer to provide a ground level dressing area adjacent to an elevated sleeping area. The present invention provides a tent frame design which greatly facilitates the process of setting up and collapsing the tent upon the trailer.

The trailer of the invention generally comprises a conventional trailer frame and running gear, including an axle assembly with wheels and tires, a generally rectangular base frame, a body, and a tongue extending outwardly from the base frame perpendicular to the axis of the axle for interconnection of the trailer to a tow vehicle.

The body of the trailer comprises a box-like storage compartment with an open top, a top closure frame pivotally interconnected to the storage compartment, a first bed support pivotally interconnected to the top closure frame, and a second bed support also pivotally interconnected to the top closure frame. The storage compartment of the body includes a bottom closure and side walls extending upwardly therefrom. The storage compartment is interconnected to the base frame of the trailer.

The top closure frame of the body of the trailer comprises a pair of side beams and a pair of shorter end beams, interconnected to form a rectangular frame of approximately the same dimensions as the base frame of the trailer, with four upright legs of equal length, each extending upwardly from a respective corner of the rectangle formed by the side and end beams. The side and end beams are formed to create an inwardly extending lip to receive the outer edges of the first bed support. The top closure frame is pivotally interconnected to the storage compartment by hinged connections between one side beam of the top closure frame and the upper end of one of the longer side walls of the storage compartment, so that the top closure frame is aligned with the storage compartment but may be pivoted about the hinged connection.

The first bed support, comprising a planar board, is dimensioned to fit within the top closure frame with its edges resting upon the lip of the side and end beams, and is pivotally interconnected to adjacent upright legs of the top closure frame so that the axes of rotation of the first bed support and of the top closure frame are parallel along the same side of the trailer. The second bed support, comprising a planar board, is also pivotally interconnected to the same upright legs of the top closure frame with its axis of rotation also parallel to the axes of rotation of the first bed support and of the top closure frame. The hinge used to form the pivotal interconnection of the second bed support is adapted such that the second bed support may be rotated about that interconnection through 180 degrees to a position within the plane of the first bed support to form a full bed platform with its upper surface in the same plane. The second bed support is preferably provided with a folding prop for the purpose of supporting the second bed support relative to the ground with the tent set up for use.

The tent of the invention comprises tent frame components, including a dressing area floor frame and tent supports, and the tent enclosure, including dressing area floor, walls and roof. The dressing area floor frame comprises a rectangular frame dimensioned to fit within the four upright legs of the top closure frame of the body of the trailer, and to be supported at the upper ends of such upright legs. No permanent direct interconnection is formed between the dressing area floor frame and the top closure frame, so that the dressing area floor frame may be fully removed from the top closure frame and placed upon the ground immediately adjacent to the body of the trailer. The tent enclosure is attached to the dressing area floor frame and to the top closure frame of the trailer body, forming an indirect interconnection between the dressing area floor frame and the trailer body.

The tent supports include a first set of combined upright and lateral supports, to support the portion of the tent enclosure associated with the dressing area and the adjacent end of the sleeping area, and a second set of combined upright and lateral supports, to support the opposite end of the sleeping area portion of the tent enclosure. Each of the supports is formed as an elongate U-shaped upright, with a U-shaped lateral support interconnected thereto in pivotal and sliding relation. The U-shaped upright of each set of supports is pivotally interconnected to the top closure frame of the trailer body. The free end of each leg of the U-shaped lateral supports is slideably disposed on respective legs of the U-shaped upright and is adapted such that the position of the ends of the legs of the lateral support can be fixed relative to the upright.

The tent enclosure is interconnected to two sides of the top closure frame of the body of the trailer, to all four sides of the dressing area floor frame, to three sides of the second bed support, to the base (as distinguished from legs) of each of the U-shaped upright supports, and to the base of each of the U-shaped lateral supports. To erect the tent from a collapsed position upon the trailer, the dressing area floor frame is first lifted from the upright legs of the top closure frame and placed on the ground at side of the trailer body opposite the side to which the top closure frame is pivotally interconnected. As the dressing area floor frame is removed from the trailer body the dressing area portion of the tent enclosure is removed with it. The tent enclosure supports are raised from the trailer, along with the remaining portions of the tent enclosure. The second bed support is then rotated 180 degrees from the trailer about its pivotal interconnection to the top closure frame to align with the first bed support and form a planar sleeping surface, establishing the perimeter configuration of the tent enclosure.

Erection of the tent enclosure is completed by sliding the collars to which the legs of the lateral support of the respective first and second sets of tent enclosure supports along the legs of the associated upright support, forcing the base of the lateral support away from the base of the upright support and stretching the tent enclosure between them. When the desired tension is obtained the collars are tightened relative to the legs of the upright support on which they are slideably disposed to maintain the tent enclosure tension.

With the tent fully erected, the storage compartment within the body of the trailer is readily accessible from within the dressing area of the tent enclosure by lifting the adjacent edge of the first bed support from the lip of the top closure frame. As that edge of the first bed support is lifted the bed support rotates about its pivotal connection to the top closure frame, allowing access to the storage compartment lying directly below the first bed support. With the tent collapsed upon the trailer, the storage compartment is readily accessible from the exterior of the trailer by lifting the top closure frame, with bed supports, tent enclosure and tent enclosure supports undisturbed therein, from the side walls of the storage compartment, causing the top closure frame to rotate about its pivotal connection to one of those side wall and exposing the storage compartment.

DETAILED DESCRIPTION OF THE PREFERRED EMBODIMENT

Figure 1:
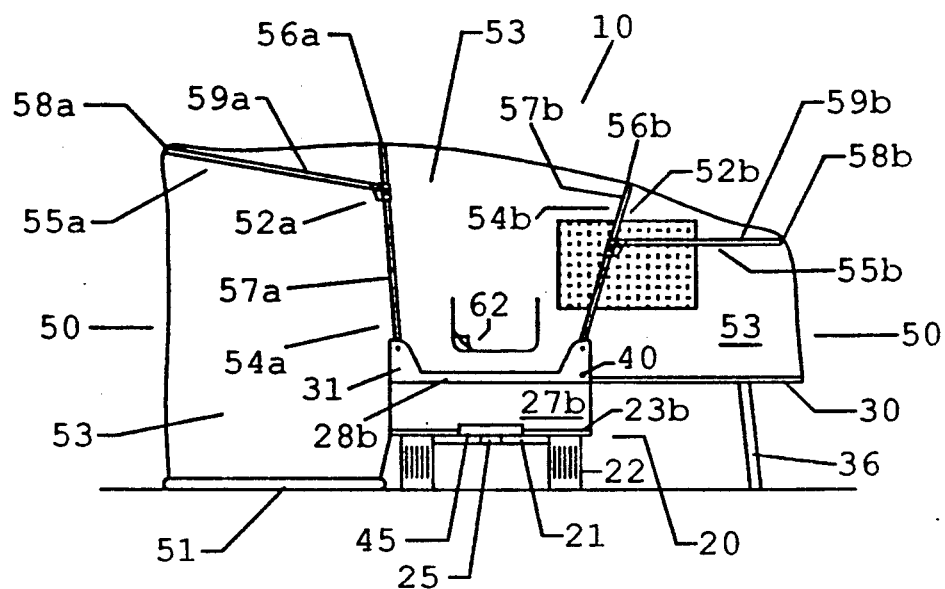
FIG. 1 is an elevation view of the preferred embodiment of the tent trailer of the invention, with the tent enclosure extended and set up for use.
Figure 2:
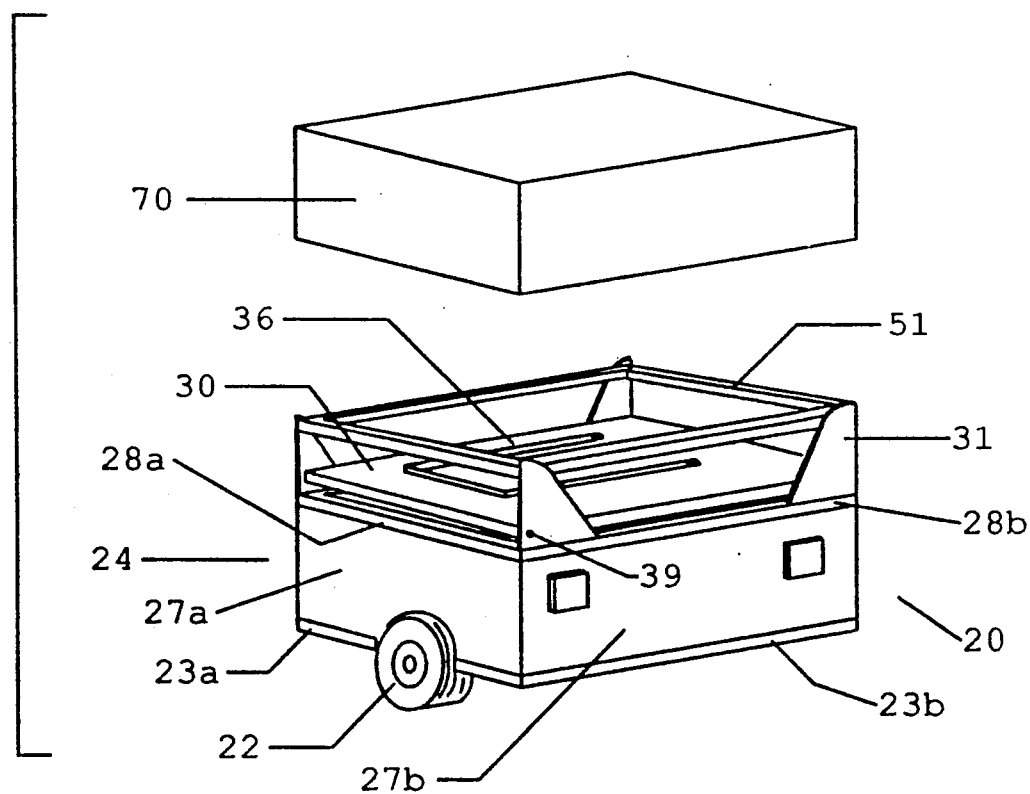
FIG. 2 is a perspective view of the trailer portion of the preferred embodiment of the invention, with the tent enclosure and tent enclosure supports omitted.
Figure 3:
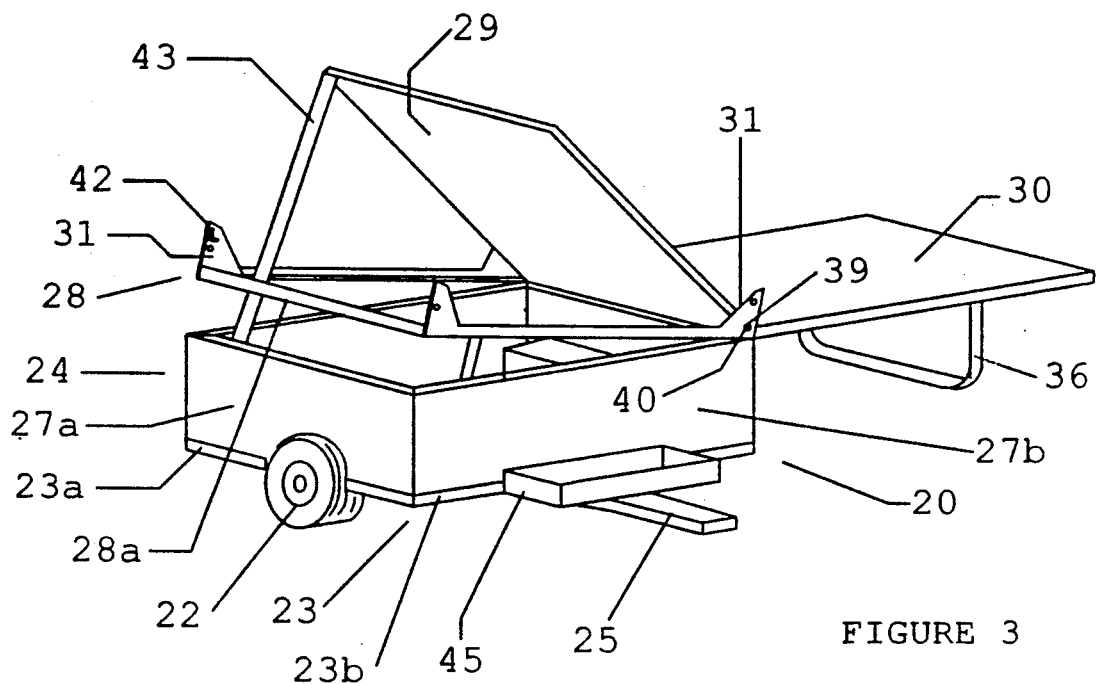
FIG. 3 is a perspective view of the trailer portion of the preferred embodiment of the invention, with the tent enclosure and tent enclosure supports, and with the cooler frame omitted, illustrating the relationship between pivotally interconnected frame components.

With reference now to the accompanying FIG. 1, the tent trailer of the invention, designated by reference numeral 10, will be seen to generally comprise a trailer portion 20 and a tent portion 50. Trailer portion 20 generally comprises a conventional trailer frame and running gear, including an axle assembly 21 with wheels and tires 22, a generally rectangular base frame 23 with first and second sides, a body 24, and a tongue 25 extending outwardly from the base frame 23 perpendicular to the axis of the axle assembly 21 for interconnection of tent trailer 10 to a tow vehicle. The length of the first sides 23a of the rectangular base frame 23 is approximately equal to the width of the sleeping area of the tent and the length of the second sides 23b of base frame 23 is approximately equal to one-half the length of the sleeping area.

Body 24 of trailer portion 20 comprises a box-like storage compartment interconnected to base frame 23, with a bottom 26, side walls 27a and 27b, corresponding to first and second sides 23a and 23b of base frame 23, and an open top. Body 24 further includes a top closure frame 28 pivotally interconnected to the upper edge of the storage compartment of body 24, a first bed support 29 pivotally interconnected to top closure frame 28, and a second bed support 30 also pivotally interconnected to top closure frame 28.

Top closure frame 28 of body 24 comprises a pair of side beams 28a and a pair of end beams 28b, interconnected to form a rectangular frame of approximately the same dimensions as base frame 23, with four upright legs 31 of equal length, each extending upwardly from a respective corner of the rectangle formed by the side and end beams 28a and 28b, respectively. In the preferred embodiment, side beams 28a and end beams 28b are formed with an L-shaped cross-section, disposed and interconnected to create an inwardly extending lip 32 to receive the outer edges of first bed support 29, and the upright legs 31 are triangular plates, for rigidity. Top closure frame 28 is pivotally interconnected to the storage compartment of body 24 by hinged connections between one side beam 28a of top closure frame 28 and the upper edge of one of the side walls 27a of the storage compartment, so that top closure frame 28 is disposed above and aligned with the side walls 27a and 27b of the storage compartment but may be lifted therefrom about the hinged connection.

First bed support 29, comprising a planar board, is dimensioned to fit within the top closure frame 28 with its edges resting upon the lip 32 of the side and end beams 28a and 28b, and is pivotally interconnected, by means of hinge 33, to the side beam 28a which is pivotally interconnected to side wall 27a, so that the axes of rotation of first bed support 29 and of top closure frame 28 are parallel along the upper edge of the same side wall 27a. Second bed support 30, also comprising a planar board, is of the same dimension and configuration as first bed support 29, and preferably includes perimeter frame 34 extending around the three outer edges of second bed support 30 but omitted from the edge adjacent to hinge 33. Second bed support 30 is pivotally interconnected to upright legs 31 of top closure frame 28 such that its axis of rotation is parallel to the axes of rotation of first bed support 29 and of top closure frame 28 at the same side wall 27a. The pivotal interconnection of second bed support 30 to upright legs 31 is made through a pair of hinges 35, adapted such that second bed support 30 may be rotated about that interconnection through 180 degrees to a position within the plane of first bed support 29 to form a full bed platform with its upper surface in the same plane. Second bed support 30 is preferably provided with a folding leg 36 for the purpose of supporting second bed support 30 relative to the ground with the tent set up for use. Leg 36 is preferably formed in a U-shaped configuration, pivotally interconnected to second bed support 30 at the free ends of the legs of the "U", but any convenient support means, such as two elongate rods, may be used within the scope of the invention.

Figure 4:
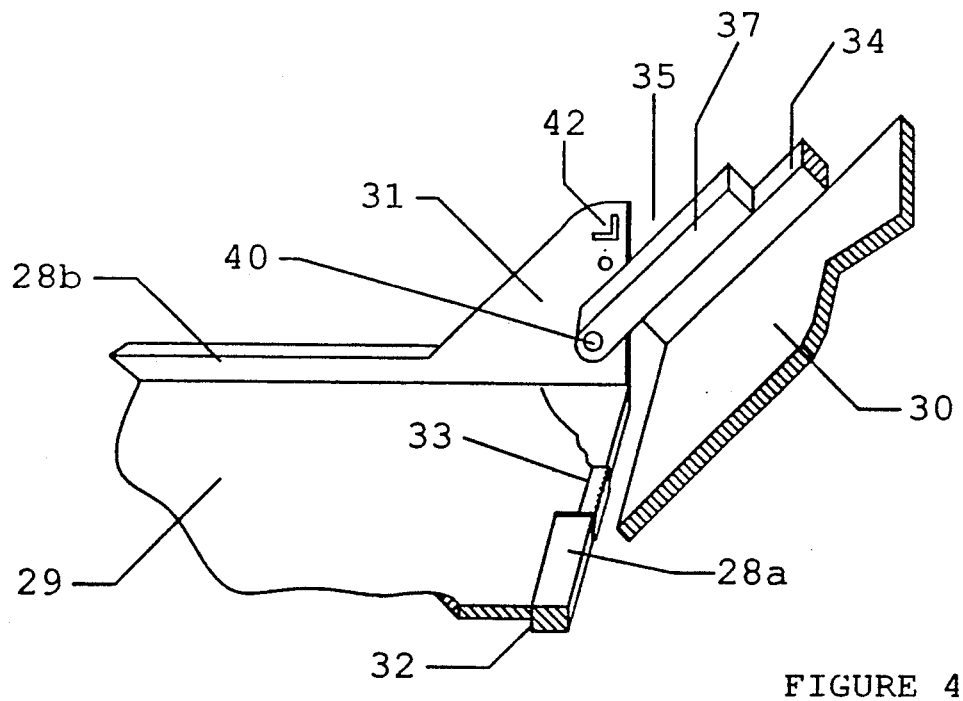
FIG. 4 is a perspective detail view of a hinge pivotally interconnecting the second bed support to the top closure frame of the trailer portion of the preferred embodiment of the invention.
Figure 5:
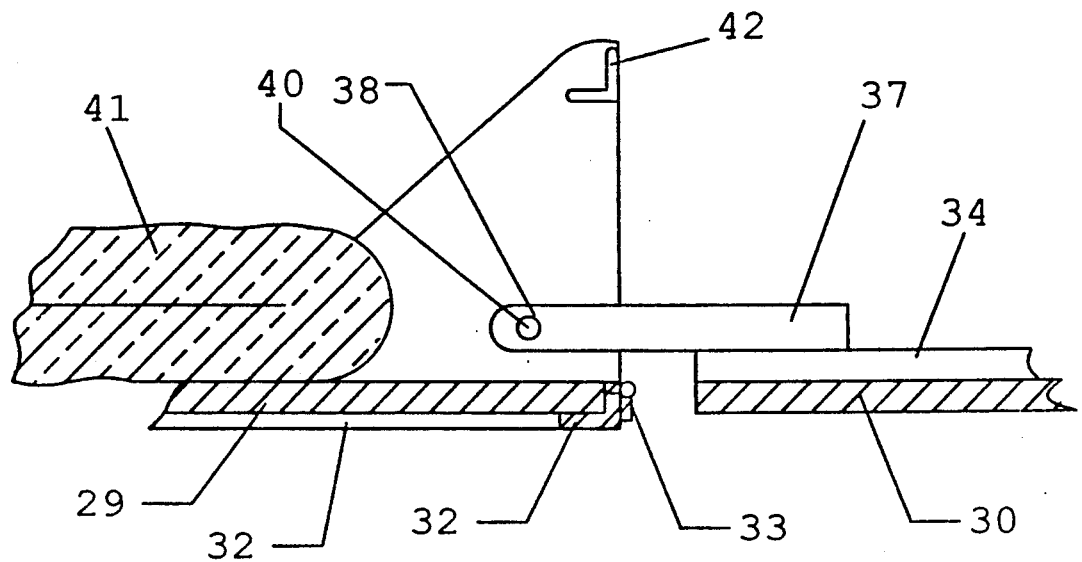
FIG. 5 is a side elevation view of the hinge of FIG. 4.

Each of hinges 35, illustrated in FIGS. 4 and 5, comprises an elongate bar 37, having an aperture 38 extending therethrough near one end thereof, with the axis of aperture 38 perpendicular to the longitudinal axis of bar 37. Bar 37 is interconnected to perimeter frame 34 of second bed support 30 such that the end of bar 37 with aperture 38 extends past the end of perimeter frame 34 and past the edge of second bed support 30 nearest hinge 33 interconnecting first bed support 29 to the respective side beam 28a. Each upright leg 31 to which second bed support 30 is to be pivotally interconnected is provided with an aperture 39 in coaxial alignment with aperture 38, to receive pin 40 therethrough and form the pivotal interconnection of second bed support 30 to top closure frame 28. With hinges 35 offset from the plane of second bed support 30, second bed support 30 will lie in the same plane as first bed support 29 when second bed support 30 is folded out. When second bed support 30 is folded over first bed support 29, the entirety of second bed support 30 and of hinges 35 lie within the perimeter defined by top closure frame 28, and a space is formed between first bed support 29 and second bed support 30, to receive and protect a folded mattress 41, shown in FIG. 5.

Tent portion 50 of tent trailer 10 comprises tent frame components, including a dressing area floor frame 51 and tent supports 52, and tent enclosure 53, including dressing area floor, walls and roof. Tent enclosure 53 is formed of a flexible fabric and may include mesh covered windows and door openings with appropriate conventional closures. Dressing area floor frame 51 comprises a rectangular frame dimensioned to fit within the four upright legs 31 of top closure frame 28 of trailer portion 20, and to be supported at the upper ends of such upright legs 31, opposite their interconnection to the beams of top closure frame 28. Dressing area floor frame 51 is received upon a support 42 at the upper end of each of upright legs 31, so that dressing area floor frame 51 may be fully removed from top closure frame 28 and placed upon the ground immediately adjacent to trailer portion 20. Tent enclosure 53 is attached to dressing area floor frame 51 and to top closure frame 28, forming an indirect interconnection between the dressing area floor frame and the trailer.

Figure 6:
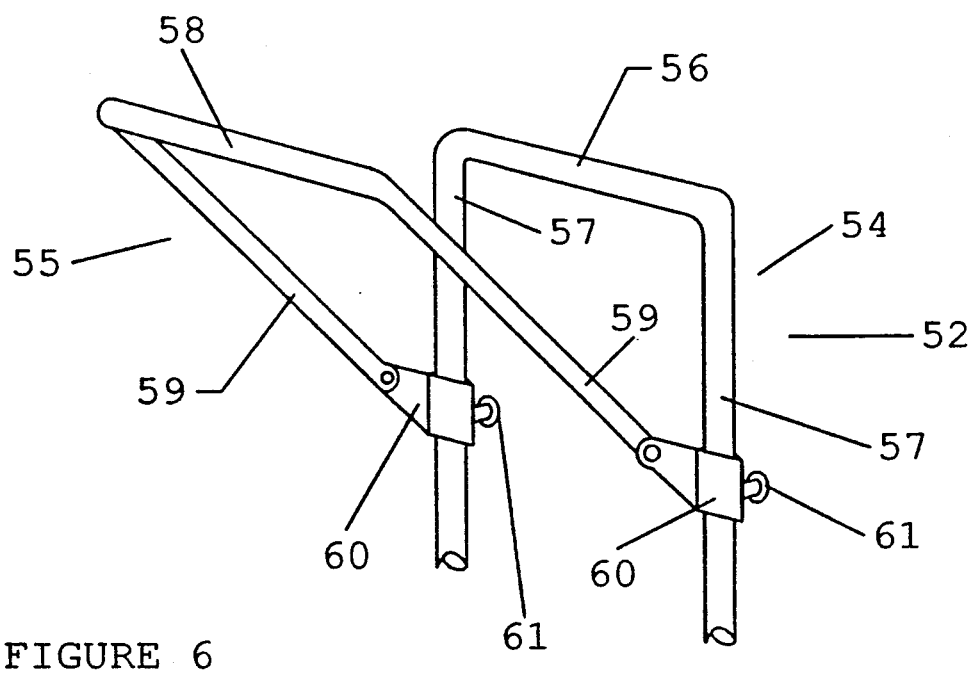
FIG. 6 is a perspective view of the tent enclosure support associated with the dressing area of the tent enclosure of the preferred embodiment of the invention.

Tent supports 52 include a first set, 52a, comprising an upright support 54a and a lateral support 55a, to support the portion of tent enclosure 53 associated with the dressing area and the adjacent end of the sleeping area, and a second set, 52b, having upright and lateral supports 54b and 55b, respectively, to support the opposite end of the sleeping area portion of the tent enclosure. Each of the supports 52, depicted in FIG. 6, comprises an elongate U-shaped upright 54, having a base 56 and a pair of legs 57, with a U-shaped lateral support 55, with a base 58 and legs 59, interconnected thereto in pivotal and sliding relation. The free end of each leg 59 of lateral support 55 is pivotally interconnected to a collar 60, each of which is slideably disposed on a respective leg 57 of upright 54 and is adapted to be releaseably tightened on such legs 57 to adjustably fix the position of the ends of legs 59 of the lateral support 55 relative to the upright 54. Collars 60 may be tightened against legs 57 by means of thumbscrews 61 as shown in FIG. 6, or by other convenient clamping means.

The U-shaped upright 54a of support 52a is pivotally interconnected to top closure frame 28 of the trailer body by pivotally interconnecting the free end of each leg 57a to one of upright legs 31 associated with one side beam 28a of top closure frame 28, such that the axis of rotation is parallel to, but on the opposite side of trailer portion 20 from, the axes of rotation of top closure frame 28 relative to the storage compartment of the trailer portion 20 and of bed supports 29 and 30 relative to top closure frame 28. The interconnection of tent supports 52b to trailer portion 20 is similar, with upright 54b pivotally interconnected to upright legs 31 associated with the opposite side beam 28a of top closure frame 28, such that the axes of rotation of tent supports 52a and 52b are parallel but separated across the body of the trailer.

In the preferred embodiment of tent trailer 10, tent enclosure 53 is formed substantially as illustrated in FIG. 1, and is interconnected to side beams 28b of top closure frame 28, to all four sides of dressing area floor frame 51, to three sides of the second bed support 30, to the base 56 of each of the U-shaped upright supports 54, and to the base of each of the U-shaped lateral supports 55.

To erect the tent portion 50 from a collapsed position upon the trailer portion 20, dressing area floor frame 51 is first lifted from upright legs 31 of top closure frame 28 and placed upon the ground at side of trailer portion 20 opposite the side to which top closure frame 28 is pivotally interconnected. As dressing area floor frame 51 is removed from the trailer body, the dressing area portion of tent enclosure 53 is removed with it. Tent enclosure support 52a is next rotated around its pivotal connection to the respective upright legs 31 of top closure frame 28 to raise that support, and a further portion of the tent enclosure, from the trailer, and position them over dressing area floor frame 51 and the portion of the tent enclosure removed from the trailer with frame 51. Tent enclosure support 52b then rotated, lifting it and the associated portion of tent enclosure 53 from the trailer and positioning them to the side of the trailer opposite dressing area floor frame 51. Second bed support 30 is then rotated 180 degrees from the trailer about its pivotal interconnection to upright legs 31 to align with first bed support 29 and form a planar sleeping surface upon which mattress 41 may be positioned. At this point in the erection process the perimeter configuration of tent enclosure 53 is set, but the walls and roof of the tent have not yet been tensioned.

Tensioning of tent enclosure 53 to complete the erection is accomplished by sliding collars 60 of supports 52a and 52b along respective legs 57, forcing base 58 of each lateral support 55 away from base 56 of upright support 54 and stretching the tent enclosure between them. When the desired tension is obtained collars 60 are tightened on legs 57 to fix the position of lateral supports 55 relative to upright supports 54 and maintain the tent enclosure tension. Tent portion 50 is collapsed upon trailer portion 20 by reversing the steps of the erection sequence, folding tent enclosure 53 as necessary for it to fit within the boundaries of top closure frame 28. In the preferred embodiment, tent trailer 10 of the invention includes a separate cover 70 which is placed over upright legs 31 of top closure frame 28 and secured in place by snaps, ties or other conventional means.

With tent portion 50 fully erected, the storage compartment defined by side walls 27 and bottom 26 is readily accessible from within the dressing area of the tent enclosure by lifting the adjacent edge of first bed support 29 from lip 32 of top closure frame 28. As that edge of first bed support 29 is lifted the bed support rotates about its pivotal connection to top closure frame 28, allowing access to the storage compartment lying directly below first bed support 29. With tent portion 50 collapsed upon trailer portion 20, the storage compartment is readily accessible from the exterior of the trailer by lifting top closure frame 28, with bed supports, tent enclosure and tent enclosure supports undisturbed therein, from the side walls 27 of the storage compartment, causing top closure frame 28 to rotate about its pivotal connection to a side wall 27a and exposing the storage compartment. In the preferred embodiment of the invention, supports 43 and 44 are provided to hold first bed support 29 and top closure frame 28, respectively, in a raised position for easy access to the storage compartment. Supports 43 and 44 may be simple props, or more complex components such as pneumatically damped telescoping supports may be used, as desired.

For further convenience, in the preferred embodiment of tent trailer 10, trailer portion 20 is provided with a cooler frame 45 supported by and interconnected to tongue 25 and adjacent side wall 27b, to hold an insulated cooler, luggage, or the like. Access to the cooler or luggage from the interior of tent enclosure 53 is achieved through a releaseable flap 62 provided in tent enclosure 53, as shown in FIG. 1. Flap 62 is provided with suitable closure means, such as a zipper, operable from within tent enclosure 53.

The foregoing detailed description of the preferred embodiment of the invention has been for purposes of illustration and not limitation, and it will be understood that the invention is susceptible to various alternative embodiments and modifications without departing from the scope of the invention as claimed.

What is claimed is:

1. A collapsible tent trailer camper, comprising a trailer portion having a trailer frame including at least one axle and at least one pair of wheel and tire assemblies;

a generally rectangular base frame, having a perimeter, supported upon and interconnected to said trailer frame;

a trailer tongue interconnected to said trailer frame and to said base frame and extending outwardly beyond the perimeter of said base frame, said tongue to be releaseably interconnected at its distal end to a towing vehicle;

a hollow storage compartment including a bottom of the same perimeter configuration and substantially the same perimeter dimensions as said base frame and being rigidly interconnected to said base frame, first and second side walls, each having an upper edge, and each interconnected to said base frame at opposite sides thereof parallel to the longitudinal axis of said tongue and in perpendicular relation to and extending upwardly from said bottom, first and second end walls, each having an upper edge, and each interconnected to said base frame at opposite sides thereof perpendicular to the longitudinal axis of said tongue and in perpendicular relation to and extending upwardly from said bottom, with said first and second side walls interconnected to said first and second end walls and with the upper edges of said side walls and of said end walls in the same plane;

a top closure frame of generally rectangular configuration defining a plane, having first and second side beams and first and second end beams, pivotally interconnected to said storage compartment by hinge means interconnected between said first side beam and the upper edge of said first side wall, said top closure frame having a substantially continuous lip extending inwardly from said side beams and said end beams in the plane of said top closure frame, and further having four substantially identical upright legs with first and second ends, each rigidly interconnected at its first end to and extending upwardly from a different corner of said top closure frame perpendicular to the plane thereof, with each of said upright legs having a support ledge interconnected thereto near the second end thereof and extending inwardly therefrom;

a first planar bed support of generally rectangular configuration and dimensioned to be received upon and supported by said lip of said top closure frame, being pivotally interconnected to said first side beam of said top closure frame such that said first bed support may be rotated about said pivotal interconnection relative to said top closure frame;

a second planar bed support of the same configuration and substantially the same dimensions as said first bed support, pivotally interconnected to two of said upright support legs of said top closure frame by a pair of second bed support hinge means, such that said second bed support may be rotated relative to said first bed support and to said top closure frame on an axis of rotation parallel to and on the same side of said top closure frame as the axes of rotation of said top closure frame relative to said storage compartment and of said first bed support relative to said top closure frame, said second bed support hinge means being adapted such that said second bed support may be disposed above and separated some distance from said first bed support and may then be rotated about said axis of rotation to be disposed in alignment with said first bed support to form a flat elongate sleeping platform; and a tent portion having a flexible tent enclosure, having a roof portion, sides, and a lower edge, said tent enclosure including a dressing area having a floor to be disposed at ground level, a sleeping area to be disposed generally above the sleeping platform formed by said first and second bed supports, and conveniently disposed passage means for ingress to and egress from the interior of said tent enclosure, said tent enclosure being interconnected through a portion of its lower edge to said top closure frame and through a further portion of its lower edge to the sides of said second bed support and to the end of said second bed support opposite its pivotal interconnection to said upright support legs of said top closure frame;

a dressing area floor frame of generally rectangular configuration with an outer perimeter, interconnected to the floor of the dressing area of said tent enclosure at said perimeter, said dressing area floor frame being dimensioned to be removeably received upon and supported by said support ledges of said upright support legs of said top closure frame;

a first tent enclosure support including a U-shaped upright support member having a base and a pair of legs with each of said legs having an end, said upright support member pivotally interconnected at the ends of the legs of said upright support member to the two of said upright legs of said top closure frame associated with the first side beam thereof and interconnected to the roof portion of said tent enclosure through the base of said upright support member, a pair of first support collars each slideably disposed on a different one of said legs of said upright support member and releaseably interconnected thereto, and a U-shaped lateral support member having a base and a pair of legs with each of said legs having an end, pivotally interconnected at the ends of the legs thereof to said first support collars and interconnected to the roof portion of said tent enclosure through the base of said lateral support member; and a second tent enclosure support including a U-shaped upright support member having a base and a pair of legs with each of said legs having an end, said upright support member pivotally interconnected at the ends of the legs of said upright support member to the two of said upright legs of said top closure frame associated with the second side beam thereof such that the axis of rotation of said second tent enclosure support relative to said top closure frame is parallel to but on the opposite side of said top closure frame from the axis of rotation of said first tent enclosure support relative to said top closure frame, and interconnected to the roof portion of said tent enclosure through the base of said upright support member, a pair of second support collars each slideably disposed on a different one of said legs of said upright support member and releaseably interconnected thereto, and a U-shaped lateral support member having a base and a pair of legs with each of said legs having an end, pivotally interconnected at the ends of the legs thereof to said second support collars and interconnected to the roof portion of said tent enclosure through the base of said lateral support member.

2. A collapsible tent trailer camper, comprising a trailer portion having a trailer frame including at least one axle and at least one pair of wheel and tire assemblies;

a trailer tongue, with first and second ends, interconnected at one end to said trailer frame and extending outwardly therefrom generally perpendicular to said axle, said tongue to be releaseably interconnected at its distal end to a towing vehicle;

a hollow storage compartment rigidly interconnected to said trailer frame, including a bottom, an open top, and first and second side walls, each extending upwardly from said bottom and each having an upper edge extending parallel to the longitudinal axis of said tongue, and first and second end walls, each extending upwardly from said bottom and each having an upper edge extending perpendicular to the longitudinal axis of said tongue, with said first and second side walls interconnected to said first and second end walls such that the upper edges of said side walls and of said end walls are in the same plane;

a top closure frame having first and second side beams and first and second end beams lying in a single plane and configured to match the configuration of said upper edges of said first and second side walls and said first and second end walls of said storage compartment, said top closure frame being pivotally interconnected to said storage compartment by hinge means interconnected between said first side beam of said top closure frame and said upper edge of said first side wall of said storage compartment;

a first planar bed support configured and dimensioned to be received upon and supported by said top closure frame, being interconnected to said top closure frame;

access means for gaining access to said storage compartment through said open top thereof without lifting said top closure frame from said storage compartment;

a second planar bed support of the same configuration and substantially the same dimensions as said first bed support, pivotally interconnected to said top closure frame such that said second bed support may be disposed above and generally parallel to said first bed support and may be rotated relative to said first bed support and to said top closure frame on an axis of rotation parallel to and on the same side of said top closure frame as the axes of rotation of said top closure frame relative to said storage compartment and of said first bed support relative to said top closure frame, such that said second bed support may be disposed in end to end planar alignment with said first bed support to form a flat elongate sleeping platform; and a tent portion having a flexible tent enclosure, having a roof portion, sides, and a lower edge, said tent enclosure including a dressing area having a floor to be disposed at ground level, a sleeping area to be disposed generally above the sleeping platform formed by said first and second bed supports, and conveniently disposed passage means for ingress to and egress from the interior of said tent enclosure, said tent enclosure being interconnected through a portion of its lower edge to said top closure frame and through a further portion of its lower edge to the sides of said second bed support and to the end of said second bed support opposite its pivotal interconnection to said upright support legs of said top closure frame;

tent enclosure support means interconnected to said trailer portion and engaging said tent enclosure for the purpose of supporting said tent enclosure in an erected position over said trailer portion.

3. The collapsible tent trailer camper of claim 2, wherein said access means comprises a substantially planar access door pivotally interconnected to said trailer portion such that said access door may be rotated about said pivotal interconnection to gain access to said storage compartment through the top thereof with said tent enclosure in an erected position.

4. The collapsible tent trailer camper of claim 3, wherein said substantially planar access door comprises said first bed support.

5. The collapsible tent trailer camper of claim 2, wherein said tent enclosure support means includes a plurality of U-shaped support members each having a base and a pair of legs with each of said legs having an end, each of said support members being pivotally interconnected at the ends of the legs of said support member to said top closure frame, and interconnected to the roof portion of said tent enclosure through the base of said upright support member.

6. The collapsible tent trailer camper of claim 2, wherein said tent enclosure support means includes a first tent enclosure support including a U-shaped upright support member having a base and a pair of legs with each of said legs having an end, said upright support member pivotally interconnected at the ends of the legs of said upright support member to said first side beam of said top closure frame and interconnected to the roof portion of said tent enclosure through the base of said upright support member, a pair of first support collars each slideably disposed on a different one of said legs of said upright support member and releaseably interconnected thereto, and a U-shaped lateral support member having a base and a pair of legs with each of said legs having an end, pivotally interconnected at the ends of the legs thereof to said first support collars and interconnected to the roof portion of said tent enclosure through the base of said lateral support member; and a second tent enclosure support including a U-shaped upright support member having a base and a pair of legs with each of said legs having an end, said upright support member pivotally interconnected at the ends of the legs of said upright support member to said second side beam of said top closure frame such that the axis of rotation of said second tent enclosure support relative to said top closure frame is parallel to but on the opposite side of said top closure frame from the axis of rotation of said first tent enclosure support relative to said top closure frame, and interconnected to the roof portion of said tent enclosure through the base of said upright support member, a pair of second support collars each slideably disposed on a different one of said legs of said upright support member and releaseably interconnected thereto, and a U-shaped lateral support member having a base and a pair of legs with each of said legs having an end, pivotally interconnected at the ends of the legs thereof to said second support collars and interconnected to the roof portion of said tent enclosure through the base of said lateral support member.

7. The collapsible tent trailer camper of claim 2, wherein said tent portion further includes a dressing area floor frame of generally planar configuration, with an outer perimeter, interconnected to the floor of the dressing area of said tent enclosure at said perimeter, said dressing area floor frame being dimensioned to be removeably received upon and supported by said top closure frame.

8. The collapsible tent trailer camper of claim 2, wherein said first bed support is disposed upon said top closure frame within the area defined by said first and second side beams and said first and second end beams thereof, and wherein said second bed support, said tent enclosure, and said tent enclosure support means are configured and dimensioned to be received upon said first bed support within the area defined by said first and second side beams and said first and second end beams of said top closure support with the tent-trailer camper in a collapsed position.

9. The collapsible tent trailer camper of claim 8, further comprising a cover to be received over said tent enclosure, said tent enclosure support means, and said second bed support and releaseably interconnected to said trailer portion with the tent trailer camper in a collapsed position.

10. The collapsible tent trailer camper of claim 2, wherein said top closure frame further includes four substantially identical upright legs each rigidly interconnected to and extending upwardly from a different corner of said top closure frame generally perpendicular to the plane thereof, and wherein said second bed support is pivotally interconnected to said top closure frame by second bed support hinge means pivotally interconnected to an adjacent two of said upright support legs such that said second bed support may be disposed over and separated some distance from said first bed support with the plane of said second bed support substantially parallel to the plane of said first bed support.

11. The collapsible tent trailer camper of claim 10, wherein each of said second bed hinge support means comprises an elongate bar with first and second ends, pivotally interconnected at the first end thereof to one of said upright legs of said top closure frame intermediate the ends of said upright leg, and spacer means interconnected to said bar along a portion of said bar extending from said second end thereof toward said first end thereof, with said spacer means interconnected to said second bed support such that said bar is spaced from and parallel to the plane of said second bed support.

12. The collapsible tent trailer camper of claim 11, wherein said second bed support has an outer perimeter and said spacer means comprises a perimeter frame extending around and interconnected to the perimeter of said second bed support.

13. The collapsible tent trailer camper of claim 2, wherein said trailer portion further includes a storage unit frame interconnected to said tongue adjacent to the end wall of said storage compartment beyond which said tongue extends, said storage unit frame to receive a storage unit such as a beverage cooler, and wherein said side wall of said tent enclosure includes a closable opening adjacent to said storage unit frame so as to allow access from the interior of the erected tent enclosure to a storage unit received in said storage unit frame.

14. The collapsible tent trailer camper of claim 2, wherein said second bed support includes a folding leg pivotally interconnected to said second bed support for the purpose of supporting said second bed support relative to the ground surface with said second bed support rotated into planar alignment with said first bed support.

* * * * *